United States Patent [19]

Carlow et al.

[11] 3,755,748

[45] Aug. 28, 1973

[54] DIGITAL PHASE SHIFTER/SYNCHRONIZER AND METHOD OF SHIFTING

[75] Inventors: Earl F. Carlow, Scottsdale; Edward C. Hepworth, Apache Junction, both of Ariz.

[73] Assignee: Motorola, Inc., Franklin Park, Ill.

[22] Filed: Mar. 6, 1972

[21] Appl. No.: 217,909

[52] U.S. Cl. ............ 328/155, 178/69.5 R, 307/269, 328/72, 328/134, 328/179

[51] Int. Cl. .......................... H03b 3/04, H03k 5/18

[58] Field of Search ............................ 307/208, 269; 328/63, 72, 134, 155, 179; 178/69.5 R

[56] References Cited

UNITED STATES PATENTS

| | | | |
|---|---|---|---|
| 3,185,963 | 5/1965 | Peterson et al. | 328/63 X |
| 3,069,568 | 12/1962 | Day, Jr. | 307/269 X |
| 3,200,340 | 8/1965 | Dunne | 307/269 X |
| 3,209,265 | 9/1965 | Baker et al. | 328/63 |
| 3,440,547 | 4/1969 | Houcke | 328/155 X |
| 3,549,804 | 12/1970 | Greenspan et al. | 328/63 X |
| 3,593,160 | 7/1971 | Moore | 328/63 |
| 3,597,539 | 8/1971 | Clark | 307/269 X |

*Primary Examiner*—Stanley D. Miller, Jr.
*Attorney*—Vincent J. Rauner and Thomas G. Devine

[57] ABSTRACT

An electronic synchronizer for snychronizing the output pulse rate of an electronic clock with an input pulse train. The synchronizer provides a sampling signal output at a desired time within the time period of a single pulse of the input pulse train. The synchronizer phase-shifts the sampling signal by one-half of 1 clock cycle to either slow or speed the sample time, when required. A method of synchronizing by phase shifting the sample signal by one-half of 1 clock cycle is also disclosed.

29 Claims, 4 Drawing Figures

DIGITAL PHASE SHIFTER/SYNCHRONIZER AND METHOD OF SHIFTING

BACKGROUND OF THE INVENTION

An electronics system, designed to handle electronic impulses at a given frequency rate and intended to handle electronic waveform impulses as an input to the system when such input impulses are of a frequency rate not necessarily the same as that of the system, must be capable of synchronizing the input pulses with the pulse rate of the system itself. It is an essential requirement for the electronic system to be able to orderly handle the input pulses at an inherent system rate designed for maximum efficiency.

In the prior art, electronic systems have been designed to cope with this problem by effectively storing the input pulses for a prescribed period of time in a storage means and emptying the contents of the storage means after the time has elapsed, as determined by the pulse rate of the system. In this fashion, the data is received in the system at the system rate.

Another well-known system is the "phase-lock-loop" system. Two pulse trains are compared and a signal is generated, representative of the phase difference, if any, between the two. The signal is used to speed or slow one of the pulse trains. This system has a major disadvantage of having short term frequency stability when, for example, no input pulses are present. Furthermore, the phase-lock-loop does not lend itself to monolithic fabrication because of the required reactive components — a major disadvantage.

Still another prior art synchronization method is the add/substract logic system. This system phase shifts the internal clock of the system in increments of an entire cycle of the clock, either ahead or backward in time.

Our invention phase shifts the internal clock in increments of one-half of a clock pulse. Thus, for a given frequency of internal clock, our invention provides twice the accuracy of the known "add/subtract logic synchronizer". Therefore, if the state of the art packaging techniques limit the internal clock frequency, our invention still makes it possible to achieve high accuracy without doubling the frequency.

BRIEF SUMMARY OF THE INVENTION

This invention enables an electronic system to receive digital data in the form of electronic pulses, synchronizing those pulses with the basic frequency of the system itself as determined by the pulse rate output of a system clock. The synchronizer is typically incorporated in either a receiver or transmitter, and in either case, the clock plse frequency is ordinarily substantially greater than the expected frequency rate of the incoming pulses. Typically, 16 or 64 clock pulses occur during the time period necessary for 1 input pulse. Within practical limits, the higher the ratio of the frequency of the clock pulse rate to that of the incoming pulses, the greater the accuracy of the time adjustment of the sample signal. The instant invention, by way of shifting the time of the sample signal only one-half of a clock pulse effectively doubles the accuracy of adjustment without doubling theclock frequency.

In general terms, our invention involves determing the center of an incoming pulse by counting pulses derived from the clock pulses and adjusting the time of a generated sample signal either forward or backward, depending upon when the highest order stage of the counter is set. The incoming digital data pulses are typically in the "non-return-to-zero" format wherein two voltage levels are present. Typically, and arbitrarily, the positive voltage represents a "1" and a ground potential or a potential less positive represents a "0". In this format, a change in voltage level occurs only when there is a change from a 1 to a 0 or vice versa. That is to say, if a series of 1's or a series of 0's occurs, the discrete time period, or baud, of each of the digital representations is not discernible because the voltage level remains the same. Therefore, it is common practice to enter a train of synchronizing pulses which is a series of changes from one state to the other to provide a means for properly adjusting the time of the sample signal. Therefore, when actual data input is received, the midpoint of the data bit has previously been established and will enable the sample signal to occur at the time previously established until a negative data transition occurs, at which time the center of the incoming pulse is reestablished.

The synchronizer has a binary counter, as an integral component. The highest order bit of the counter provides a 1 output at the time that the counter has reached one-half of the total possible count, if the count is as predicted. If the count is lower than predicted, the counter output will be a 0 and will be thereupon utilized to positively phase shift the input to the counter by one-half of the basic clock pulse time.

If the count to the mid-point is higher than anticipated, the counter will have an output of 1 which is utilized to phase shift the input to the counter negatively by one-half clock pulse time. The 1 output of the counter, when it occurs, is used as the sample signal. Thus when the preceding data pulse has been analyzed by the synchronizer, the counter output of the sample signal is moved either forward or backward in time, as required.

The non-return-to-zero digital data input can be presented in a so-called asynchronous data format or in a sychronous data format. In the former, it is customary to present a fixed number of bits of data preceded by a "start" bit and followed by a "stop" bit or bits. Typically in asynchronous format, all 1's or all 0's are illegal codes. Therefore, each relatively short binary word (typically seven to 11 bits) has at least one negative transition and so is relatively easy to synchronize. However, in the synchronous data format there is no start bit presented nor any stop bits. Also there is no illegal code or fixed message length. Therefore, this invention is directed primarily at the synchronization problem involved in the synchronous data format type of data transmission.

The primary object of this invention is to synchronize incoming digital data in the form of electronic impulses with an electronic system internal clock pulses frequency rate.

Another object of this invention is to provide an electronic system with a sample signal which occurs at a prescribed point of an incoming electronic impulse representative of a bit of digital data.

Still another object of this invention is to advance or retard the time of the sampling signal by one-half of 1 clock cycle, depending upon whether the preceding pulse is greater or lesser in time than expected.

Still another object of this invention is to provide a synchronizer that does not advance or retard the time of the sample signal when the total time of the preceding data pulse was of a predicted duration.

These and other objects will be made clear in the description that follows.

DETAILED DESCRIPTION

Figure 1:
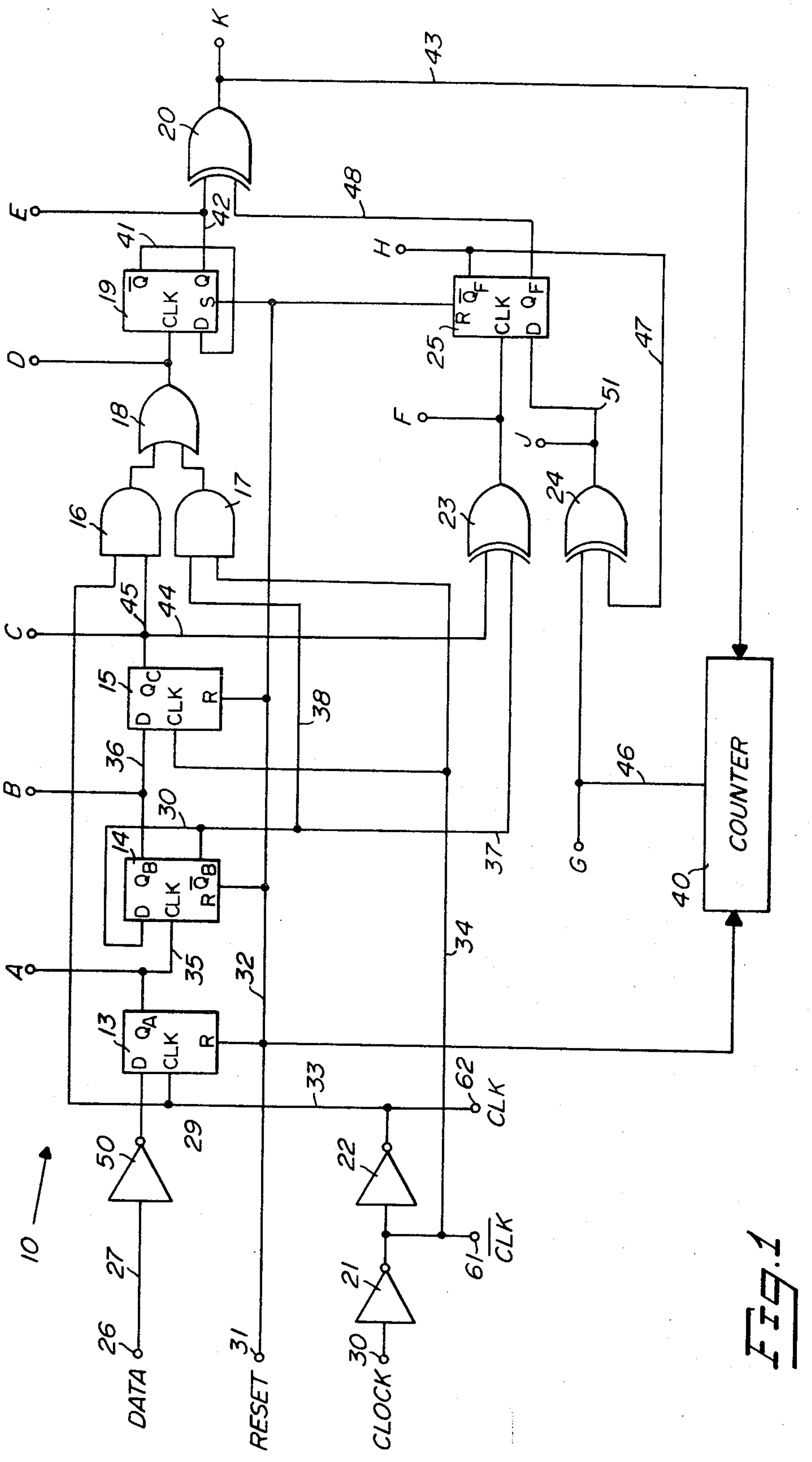
FIG. 1 is a logic diagram of one embodiment of this invention.
Figure 2:
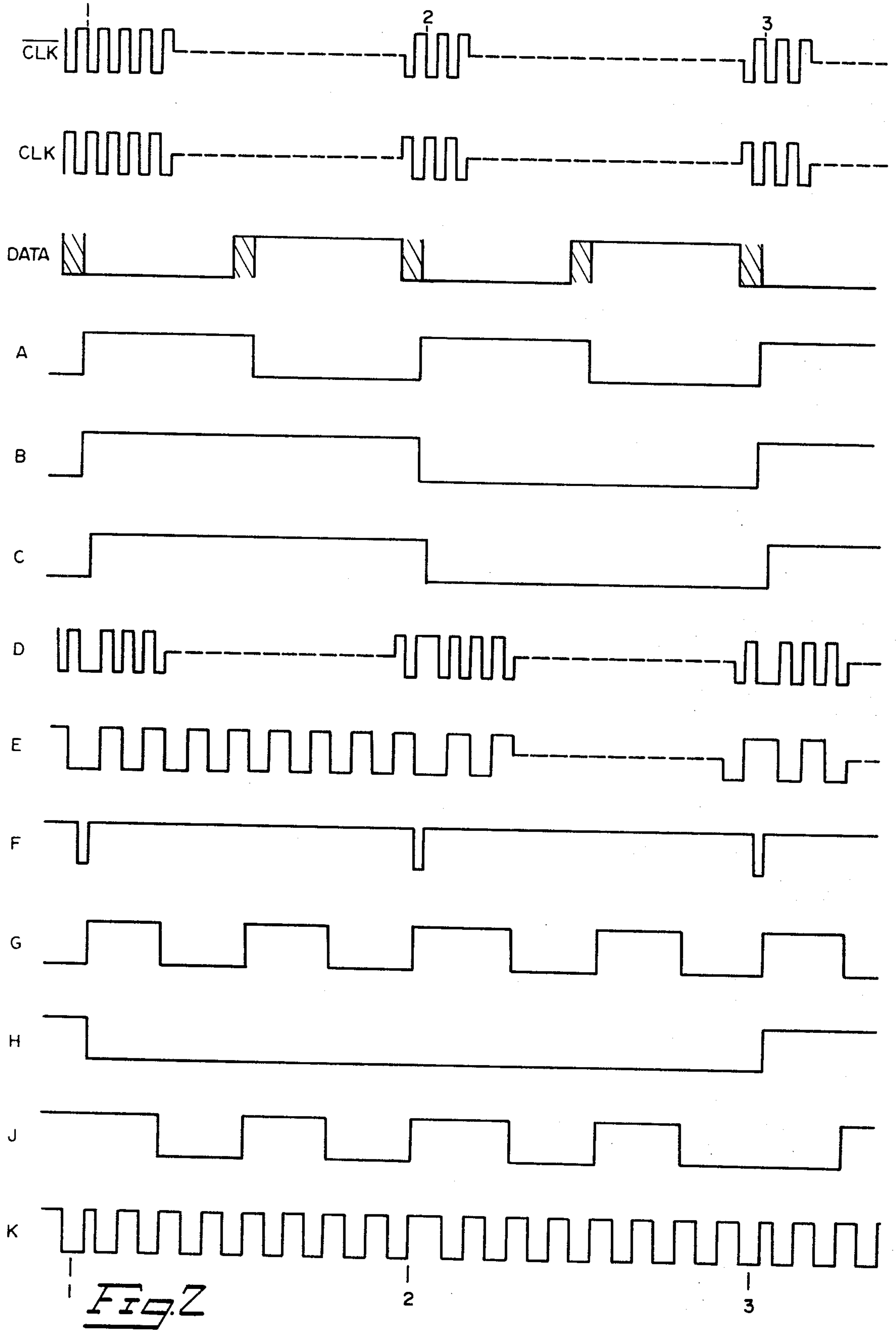
FIG. 2 is a timing chart illustrating the form of electronic impulses at specified points in FIG. 1.

The digital phase shifter/synchronizer 10 of FIG. 1 has an input terminal 26 for reception of an electronic pulse train diagrammatically shown in FIG. 2 as "Data". The input waveform is transmitted over conductor 27 to inverter 50 whose output is connected to the input of "D" type flip-flop 13.

Clock input 30 receives a train of clock pulses which are inverted at inverter 21 (shown as $\overline{CLK}$, FIG. 2) and inverted again at inverter 22 (shown as CLK, FIG. 2). The output of inverter 22 is connected over conductor 33 and conductor 29 to the clock input of flip-flop 13. Conductor 33 is also connected to AND circuit 16. The $\overline{CLK}$ output of inverter 21 is connected through conductor 34 to the clock input of flip-flop 15 and to the input of AND circuit 17. The "set" output $Q_A$ of flip-flop 13 is connected through conductor 35 to the clock input of flip-flop 14 whose "clear" or "reset" output $\overline{Q}_B$ is connected through conductor 30 to the D input of flip-flop 14. This $\overline{Q}_B$ output of flip-flop 14 is also connected to AND circuit 17 through conductor 38 and to Exclusive OR circuit 23 through conductor 37.

The set output $Q_B$ of flip-flop 14 is connected through conductor 36 to the input terminal D of flip-flop 15. The set output $Q_C$ of flip-flop 15 is connected through conductor 45 to AND circuit 16 and through conductor 44 to Exclusive OR circuit 23.

AND circuit 16 and AND circuit 17 both serve as inputs to OR circuit 18 whose output is connected to the clock input of flip-flop 19. The reset output $\overline{Q}$ of flip-flop 19 is connected through conductor 41 to the D input of flip-flop 19 and the set output Q is connected through conductor 42 to Exclusive OR circuit 20.

Exclusive OR circuit 23 has an output connected to the clock input of flip-flop 25 whose set output $Q_F$ is connected to Exclusive OR circuit 20 through conductor 48.

The output of Exclusive OR cirucit 30 is shown in FIG. 2 as waveform K which serves as a referance pulse. This output represents the clock input divided by 2 and shifted ½ cycle, either forward or backward in time, the achievement of which will be discussed in detail later. This output is connected through conductor 43 to a counter 40 whose most significant stage is monitored over line 46 to Exclusive OR circuit 24 whose output is connected to the D terminal of flip-flop 25 over conductor 51.

The reset output $\overline{Q}_F$ of flip-flop 25 is connected through conductor 47 to Exclusive OR circuit 24. The waveform present at terminal $\overline{Q}_F$ is shown as "H" on FIG. 2.

When the power is initially supplied to this circuit, the component parts are initialized by the application of a pulse to reset terminal 31 and along conductor 32 to reset flip-flops 13, 14, 15, and 25, to set the counter 40 to 0, and to set flip-flop 19. The counter serves as a means for indicating whether the sampling pulse occurs early or late, and the remainder of the circuit serves as a means for generating a reference pulse shifted by one-half of 1 of the clock input cycles in the appropriate direction.

FIG. 2 has representations of waveforms at various points of FIG. 1. These waveforms will be explained in detail in the discussion of the operation which follows.

Figure 3:
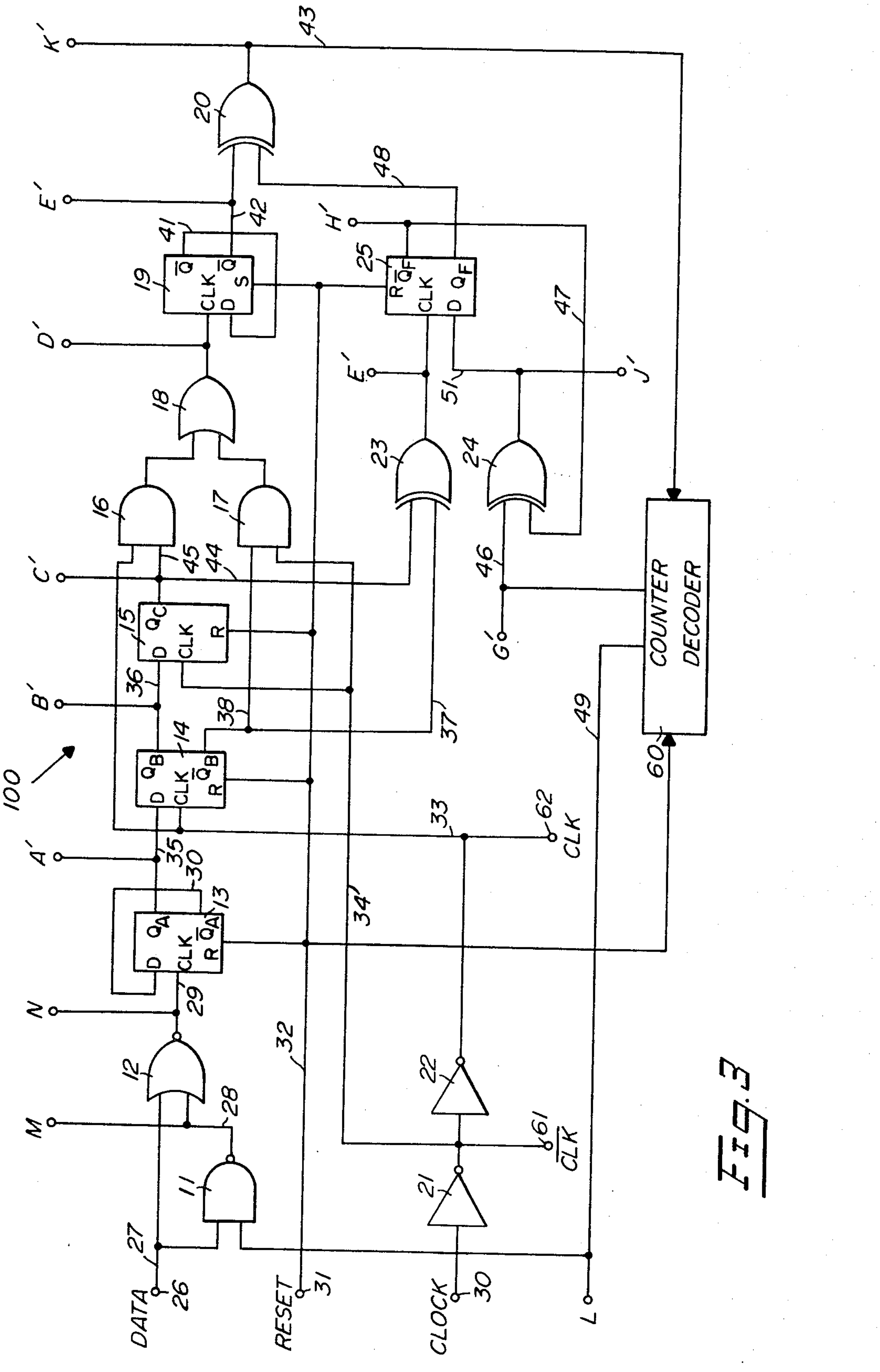
FIG. 3 is a logic diagram of another embodiment of this invention.

FIG. 3 illustrates another embodiment of this invention, 100. This embodiment provides a sampling signal which is retarded or advanced (as does the embodiment of FIG. 1) but with an additional feature of not shifting when a shift is not deemed required or necessary. A decoder mechanism is combined with the counter 40 of FIG. 1 to form the counter-decoder 60 of FIG. 3. An inhibiting output of counter-decoder 60 is transmitted on conductor 49 to NAND circuit 11, the output of which is connected over conductor 28 to the input of NOR circuit 12. The data terminal 26 is connected by way of conductor 27 as an input of both NAND circuit 11 and NOR circuit 12.

In the embodiment of FIG. 3, flip-flops 13 and 14 are connected differently than as shown in FIG. 1. In FIG. 3, the output of NOR circuit 12 is connected through conductor 29 to the CLK input of flip-flop 13. The $\overline{Q}_A$ terminal of flip-flop 13 is connected through conductor 30 to the D terminal of flip-flop 13. The $Q_A$ terminal of flip-flop 13 is connected through conductor 35 to the D terminal of flip-flop 14. The CLK terminal 62 is connected through conductor 33 to the CLK terminal of flip-flop 14. The $\overline{Q}_B$ terminal of flip-flop 14 is connected through conductor 38 to AND circuit 17 and over conductor 37 to Exclusive OR circuit 23.

The remainder of connections to components, and the components are identical to those of FIG. 1 and need not be repeated here.

Figure 4:
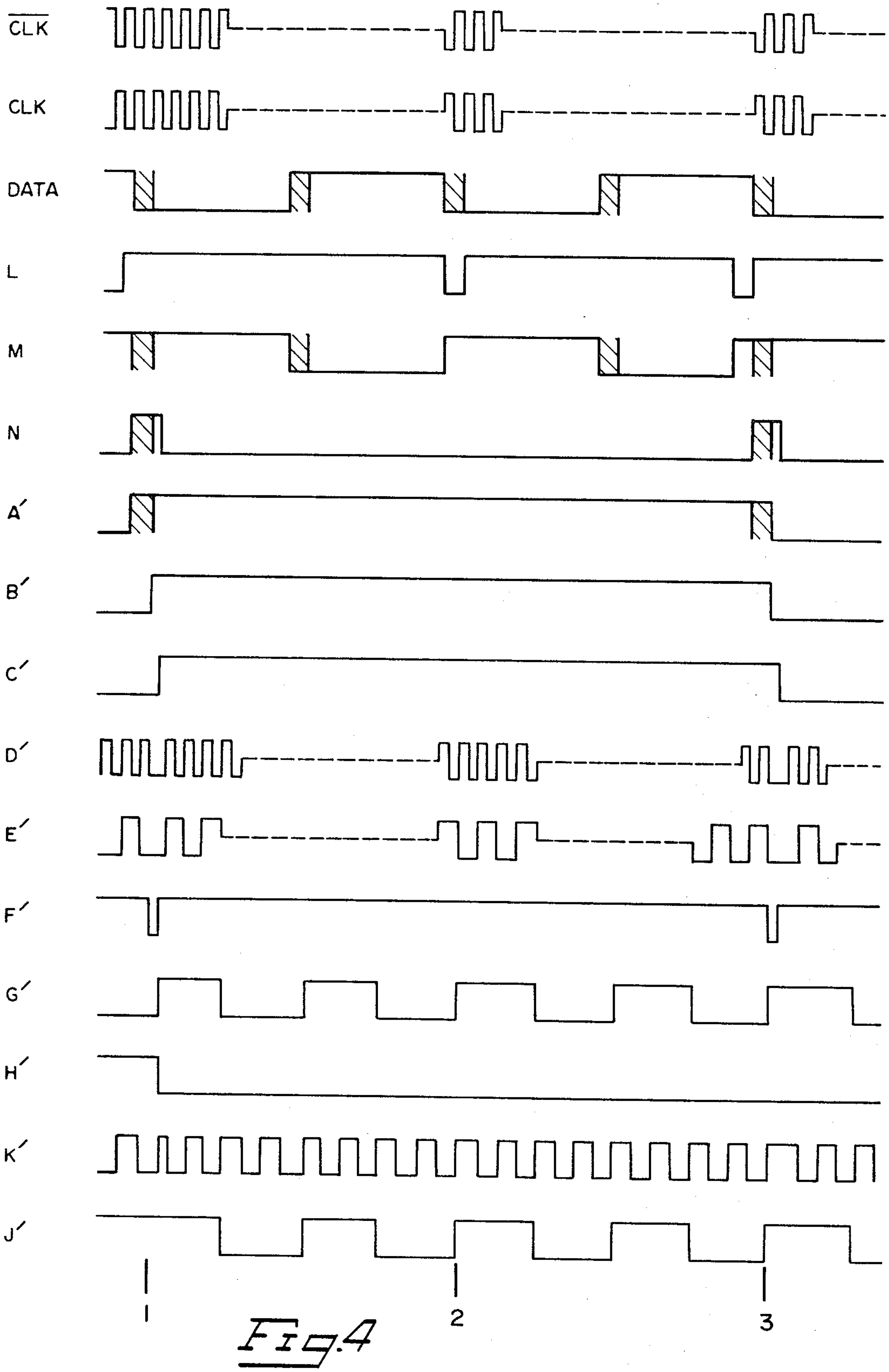
FIG. 4 is a timing chart illustrating the form of electric impulses at certain selected points in FIG. 3.

FIG. 4 has a plurality of representations of waveforms present at various points of the circuit of FIG. 3. These waveforms will be discussed in detail in the ensuing discussion.

MODE OF OPERATION

Referring now to FIGS. 1 and 2, a clock pulse input is applied at terminal 30, inverted by inverter 21 with the output of inverter 21 shown as $\overline{CLK}$ in FIG. 2. The $\overline{CLK}$ pulse train is inverted by inverter 22 producing the CLK pulse train shown in FIG. 2. Obviously, the clock input at terminal 30 could be used instead of the clock output of inverter 22. However, for purposes of appropriate interfacing, the embodiment shown is preferred. Also, for ease of description, eight clock pulses are shown for each data pulse. This number is selected for purposes of illustration only. As a practical matter, 16 or 64 clock pulses per data pulse are incorporated, as an engineering design, not a limitation.

The data input pulses are applied at terminal 26. As shown in FIG. 2, the data pulses are not synchronized with the clock at either the leading or trailing edges thereof and may occur anywhere in the respective cross-hatched areas. The data is inverted by inverter 50 and used to condition flip-flop 13 for setting by the clock via line 33. The purpose of flip-flop 13 is to establish the leading and trailing edge of the data pulse as shown in waveform A. Flip-flop 14 divides waveform A by 2 with an output shown as waveform B. Flip-flop 14 establishes the trailing edge of the data pulse as the trigger for the system. Of course, the trailing edge of one pulse is also the leading edge of the subsequent pulse and can be considered as such. Flip-flop 15 shifts the waveform B negatively ½ clock cycle as shown at waveform C.

Flip-flop 15, together with flip-flop 14 and Exclusive OR circuit 23, produces waveform F which is used as a clock input to flip-flop 25.

And circuits 16 and 17 serve as inputs to OR circuit 18 whose output is shown at waveform D. If the reset output of flip-flop 14 is $\bar{B}$ and the set output of flip-flop 15 is designated C, then waveform D can be represented by the Boolean expression:

$$(1)\ D = CLK \cdot C + \overline{CLK} \cdot \bar{B}$$

Waveform D is therefore at the clock frequency but shifted in a negative direction by ½ clock pulse at each negative transition of data. Therefore, the combination of flip-flops 13, 14 and 15, and the logic array of AND circuits 16 and 17 and OR circuit 18 serves as a means for phase shifting the input clock pulse by only one-half of 1 clock cycle. Waveform D serves as a clock input to flip-flop 19 whose function is to divide waveform D by 2, as shown in waveform E.

Waveform F, as mentioned above, is formed by the outputs of flip-flops 14 and 15. Waveform F is therefore represented by the following Boolean equation:

$$(2)\ F = B \cdot C + \bar{B} \cdot \bar{C}$$

The resultant waveform F remains a 1 until there is a positive transition of waveform A. Waveform F then becomes a 0 and remains such until ½ clock cycle has elapsed. It then goes back to the 1 state. The transition of waveform F from 0 to 1 serves a very important function, namely that of serving as the clock impulse to flip-flop 25, causing it to change state when the output G of counter 40 is 0. Thus Exclusive OR circuits 23 and 24, together with flip-flop 25 serve as a means for monitoring counter 40 and provide a signal when action should be taken. Counter 40 serves as a means for indicating whether output G is a 0, a first predetermined condition, and also provides a sampling pulse when a second predetermined condition is reached, for example, the most significant bit becoming a 1.

Certain assumptions must be made in order to explain the operation of this invention. First, assume that flip-flop 25 has been reset causing its $\bar{Q}$ output to go to 1, shown as waveform H. Also assume that the highest order bit of counter 40 has not yet switched to the 1 state by the time that waveform A makes a positive transition. The output of this most significant bit of counter 40 is shown as waveform G. Waveform G and waveform H are applied to Exclusive OR circuit 24 producing waveform J. In Boolean form:

$$(3)\ J = G \cdot \bar{H} + \bar{G} \cdot H$$

Therefore, as shown in FIG. 2, with G = 0 and H = 1 at the outset, J = 1. When waveform F goes positive, it toggles flip-flop 25 to the set state because J = 1. Therefore, the reset output of flip-flop 25 goes to 0 as illustrated by waveform H. The set output of flip-flop 25 is applied to Exclusive OR circuit 20 to which is also applied waveform E. The output K, which may be considered as a reference pulse because subsequent operations depend on its direction of shift, of Exclusive OR circuit 20 is expressed in the following Boolean equation:

$$(4)\ K = E \cdot H + \bar{E} \cdot \bar{H}$$

An examination of waveform K as shown in FIG. 2 reveals it to be of the same frequency as waveform E, but positively shifted so that it is exactly out of phase with waveform E. It must be remembered that waveform E is shifted negatively ½ clock pulse upon each occurrence of a positive transition of waveform A. Therefore, waveform K is shifted positively a net ½ clock pulse. From the preceding discussion, this is as expected, and will result in the count in the counter being advanced by ½ cycle causing the most significant bit of the counter 40 to go from 0 to 1, ½ clock pulse earlier. This is illustrated by waveform G at time 2 of FIG. 2 and should be examined with respect to the second positive transition of waveform A.

Waveform D is seen to shift negatively by ½ clock pulse at time 2 as a result of waveforms B and C, the outputs respectively of flip-flops 14 and 15. Waveform E, which is waveform D divided by 2, is also negatively shifted by ½ cycle.

An examination of waveform G illustrates that at this second transition, the most significant bit of counter 40 has just gone positive with respect to the negative transition time.

Keeping in mind that flip-flop 25 was set at Time 1, as illustrated by waveform H having gone from positive to negative as the reset output of flip-flop 25, an examination of Boolean equation 3 above makes it clear that the input J to flip-flop 25 is now a 1 and therefore flip-flop 25 does not change state when waveform F goes from 0 to 1. Since flip-flop 25 does not change state, there will be a net negative shift of ½ of 1 clock cycle. The negative ½ shift is inherent in the system as illustrated in waveforms E and K and is overcome by a full positive shift when the output of counter 40 is a 0 causing flip-flip 25 to change state.

An examination of waveform D reveals a negative shift of ½ of 1 clock cycle, reflected also by waveform E. Waveform K illustrates a ½ cycle delay at the output of Exclusive OR 20. Since the train of pulses from Exclusive OR 20 represented by waveform K causes the counter to count, waveform G should also represent a slowed count. An examination of waveform G reveals that the most significant bit remains 1 for an additional ½ clock cycle.

A third positive transition of waveform A is seen at Time 3 of FIG. 2. Waveforms B and C are shown going positive at the transition time and ½ cycle later respectively, causing the output of Exclusive OR circuit 23, as represented by waveform F, to go to 0 for ½ clock cycle. Waveforms D and E again shift negatively ½ cycle.

From the previous transition, it would be expected that the output of counter 40 would have been slowed by the negative shift. The negative transition occurs when waveform G is 0, as expected. The events surrounding the first negative transition described above, occur again.

The output of counter 40 is used directly as a sampling signal or can be used to trigger another sampling circuit. From the above discussion, it is clear that the system continually adjusts the time when the most significant bit of the counter becomes set with respect to the positive transition of waveform A. The shifting is done in ½ clock cycle steps, either positive or negative. Thus, a sampling signal is provided to the electronic apparatus such as, but not limited to, a frequency shift type receiver or transmitter. The negative and positive shifting is done to optimize the timing of the sample pulse provided with respect to the waveform to be sampled.

Referring now to FIG. 3, another embodiment of this invention is shown. The numbering of components has been kept as consistent as possible with that of FIG. 1 for ease of understanding. Generally speaking, the circuit to the right of a line cutting to the right of flip-flop 14 and counter decoder 60 is identical to FIG. 1. The differences in FIG. 3 enable the synchronizer to avoid shifting in either direction if the most significant bit of the counter goes from 0 to 1 within a predetermined time period.

Reference should be made to FIGS. 3 and 4 for an understanding of the operation of this embodiment of the synchronizer. The data input at terminal 26, the clock input at terminal 30 and the reset input at terminal 31 are all identical to those of the embodiment shown in FIG. 1. Assume that flip-flops 13, 14, 15, and 25 have been reset and that flip-flop 19 has been set, and that counter of counter-decoder 60 has been reset to 0. Assume a 1 data pulse is applied to terminal 26 and then over conductor 27 to NAND circuit 11 and NOR circuit 12. NAND circuit 11 is provided with another input from counterdecoder 60 as represented by waveform L. Crucial to the working of this embodiment is the fact that NAND circuit 11 has inherent delay so that a time difference exists between the data pulse applied to NOR circuit 12 on conductor 27 and the output of NAND circuit 28.

There are many logic arrays that could be used to "look" at the state of the counter of counter-decoder 60 to produce an output when the counter is 0. Decoders are commercially available to provide such indicia and thus a detailed explanation is not necessary here. Suffice it to say that a counter-decoder combination 60 has an output available from the decoder section which will be a continuous 1 except when the contents of the counter is 0. Then the output of the decoder section goes to 0, and if the data pulse negative transition occurs at the same time, the phase-shifter will be disabled as discussed below. By looking at the negative transition of data at Time 1 on FIG. 4, it can be seen that waveform L is a 1 at the time of the negative transition of the data pulse. This condition of waveform L should permit normal operation of the synchronizer to either negatively or positively shift by ½ clock cycle as described with reference to the embodiment of FIG. 1.

The output of NAND circuit 11 is shown as waveform M. In Boolean form, waveform M may be expressed as follows:

$$(5)\ M = -\overline{Data \cdot L}$$

"Data" of equation 5 is expressed as a negative to represent the delay time experienced through NAND circuit 11. The reason will be evident when the output of NOR circuit 12 as represented by waveform N is examined. Waveform N may be expressed as:

$$(6)\ N = -Data \cdot L \cdot \overline{Data}$$

Equation 6 makes it evident that in the presence of a 1 output from the counter-decoder 60 as represented by waveform L, there will be a pulse at the output of NOR circuit 12 of a time duration equal to the difference in time between the −Data and $\overline{Data}$ pulses. The initiation pulse shown in waveform N is impressed on the clock input of flip-flop 13 which was originally reset and whose reset output has since been a 1 applied to its D terminal, thus causing flip-flop 13 to set upon reception of the N pulse. The setting of flip-flop 13 causes the setting of flip-flop 14 when the clock pulse from inverter 22 goes from 0 to 1, synchronizing flip-flop 14 with the clock. Flip-flop 15, as explained in the discussion of the embodiment of FIG. 1, is set by the output of flip-flop 14 (waveform B′) and the application of the $\overline{CLK}$ pulse supplied at the output of inverter 21. Flip-flop 15 is therefore set ½ clock cycle later than flip-flop 14 as evidenced in FIG. 4, waveforms B′ and C′. This difference produces a negative shift in waveform D′ and a negative shift in waveform E′.

However, the negative transition occurs when G′ is 0, setting the stage for a change in state of flip-flop 25 which was originally reset. Referring to equation 3 above, it is readily seen that when H′ is a 1 and G′ is a 0, J′ is a 1 and therefore flip-flop 25 will set when F′ goes from 0 to 1. As discussed with reference to the embodiment of FIG. 1, a change in state of flip-flop 25 results in a full clock cycle advance of waveform K′ with respect to waveform E′, with a net advance of ½ clock cycle at ½ of the clock frequency. The time at which the most significant bit of the counter portion of counter-decoder 60 goes from 0 to 1 should be advanced by a positive ½ clock cycle and it is, as evidenced by waveform G′.

As a result of the adjustment made to advance the counter in a positive direction, at Time 2 on FIG. 4, waveform G′ goes from 0 to 1, activating the decoder portion of counter-decoder 60 to go from 1 to 0. Under this circumstance, N = 0 as deduced from equation 6 and shown as waveform N. Without an initiate pulse, flip-flops 13, 14 and 15 remain set as shown in waveforms A′, B′ and C′. Referring to equation 1 it can be seen that there can be no negative shift at the output of OR circuit 18 because with B′ remaining a 1, the second term of equation 1 drops out leaving:

$$D = CLK \cdot C$$

The waveform D′ (substituted for D) had been at the phase time defined by CLK·C and therefore remains unchanged, no negative shift occurring. Waveform E′, which is a division of waveform D′, also remains unchanged.

Equation 2 above when solved with B′ = 1 and C′ = 1 makes F′ equal 1. With F′ = 1, flip-flop 25 will not change state irrespective of the input at terminal D of flip-flop 25.

The net result is that the pulse output at K′ remains at the same phase and rate as it was immediately after the phase shift following Time 1. The counting rate of the counter portion of counter-decoder 60 also remains the same.

Assuming that there has been a slight change in the pulse data rate, refer to Time 3 on FIG. 4. It can be seen that the N waveform again goes to 1, causing the successive clearing of flip-flops 13, 14 and 15 as illustrated by waveforms A′, B′ and C′. At this instance, the transition occurs when the state of the highest order bit of the counter portion of counter-decoder 60 has gone from 0 to 1 as seen at waveform G'. As discussed earlier with reference to the embodiment of FIG. 1, flip-flop 25 will not change state and therefore, the inherent negative ½ clock cycle phase shift is performed as indicated in waveforms D', E' and K'.

This invention could be implemented in many ways not shown herein. For example, instead of monitoring the change from 0 to 1 of the highest order bit of the divider, one could monitor the subsequent change from 1 to 0. The inherent phase shift could be in the positive direction, with the additional full phase shift in the negative direction. With the very large number of digital circuits available, the specific implementation could be altered in many ways, wihhout going beyond the spirit and scope of this invention.

We claim:

1. A synchronizer, having a clock producing clock pulses, for synchronizing electronic input pulses of an input pulse train with the clock pulses, comprising:

a. input means, for receiving the input pulses;

b. reference pulse generating means, operatively connected to the clock and to the input means, for producing reference pulses, phase-shifted by ½ of 1 clock cycle in one direction;

c. indicating means, receiving the reference pulses, for providing an indicator signal when a first predetermined condition is reached to selectively invert the reference pulses for phase-shifting by ½ of 1 clock cycle in the other direction; and d. output means, connected to the indicating means, for providing a sampling signal when a second predetermined condition is reached.

2. The synchronizer of claim 1, further comprising;

e. inhibit means, responsive to the indicating means operatively connected to permit the reference pulse generating means to produce electronic pulses in phase with the clock pulses when the inhibit means are activated.

3. The synchronizer of claim 1 wherein the indicating means further comprise pulse counting means and provide the indicator signal when a predetermined count is reached.

4. The synchronizer of claim 2 wherein the indicating means further comprise pulse counting means and provide the indicator signal when a predetermined count is reached.

5. The synchronizer of claim 1 wherein the reference pulse generating means further comprise:

d. i. phase shifting means for reproducing the clock pulses, selectively shifted by ½ cycle in one direction;

ii. monitoring means, responsive to the indicating means and having a selectively activated output;

iii. divider means, electrically connected to the phase shifting means for dividing the reproduced clock pulse by 2, and having a reference pulse output at ½ of the clock frequency, shifted by ½ of 1 clock cycle in the one direction and serving as an input to the indicating means; and iv. logic means, responsive to the output of the monitoring means and to the divider means to permit the reference pulses to be unaffected when the monitoring means output is not activated, and to shift the reference pulses by a full clock cycle in the other direction when the monitoring means output is activated, thereby affecting a net ½ clock cycle phase shift of the reference pulses in the other direction.

6. The synchronizer of claim 2 wherein the reference pulse generating means further comprise:

d. i. phase shifting means for reproducing the clock pulses, selectively shifted by ½ cycle in one direction;

ii. monitoring means, responsive to the indicating means and having a selectively activated output;

iii. divider means, electrically connected to the phase shifting means for dividing the reproduced clock pulse by 2, and having a reference pulse output at ½ of the clock frequency, shifted by ½ of 1 clock cycle in the one direction and serving as an input to the indicating means; and iv. logic means, responsive to the output of the monitoring means and to the divider means to permit the reference pulses to be unaffected when the monitoring means output is not activated, and to shift the reference pulses by a full clock cycle in the other direction when the monitoring means output is activated, thereby affecting a net ½ clock cycle phase shift of the reference pulses in the other direction.

7. The synchronizer of claim 6 wherein the inhibit means further comprise:

e. i. decoder means, electrically connected and responsive to the indicating means, for providing an output signal when a third predetermined condition has been reached in the indicating means; and ii. gating means, operatively connected to the phase shifting means, and responsive to the decoder means output to cause the phase shifting means to shift the reproduced clock pulse waveform by ½ of 1 clock cycle in the one direction.

8. An electronic synchronizer for synchronizing the pulse rate of the waveform of an internal clock of an electronic system with the pulse rate of an input pulse train representative of digital data, comprising:

a. input means for receiving the data pulses;

b. clock input means, for receiving the clock pulses;

c. phase-shifting means, electrically connected to the input means and the clock input means for reproducing the clock waveform, phase-shifted ½ of 1 clock cycle in one direction;

d. combining means, electrically connected to the phase-shifting means, for producing a reference pulse waveform at ½ the pulse rate of the clock waveform, selectively phase-shifted by ½ of 1 clock cycle in the one direction or in the other direction;

e. indicating means, for receiving the reference pulses from the combining means and for providing an indicator signal when a predetermined condition is reached;

f. monitoring means, responsive to the phase-shifting means, for monitoring the indicating means, and electrically connected to the combining means to permit a phase shift of ½ of 1 clock cycle in the one direction in the absence of an indicator signal and to permit a phase shift of ½ of 1 clock cycle in the other direction in the presence of an indicator signal; and g. output means, electrically connected to the indicating means, to provide a sampling signal to the electronic system when a predetermined condition is reached.

9. The synchronizer of claim 8 wherein the indicating means further comprise a counter, providing the indicator signal when a predetermined count is reached.

10. The synchronizer of claim 9 wherein the clock input means further comprise inverting means to receive the clock waveform, designated CLK, and to provide an inverted clock waveform designated $\overline{CLK}$.

11. The synchronizer of claim 10 wherein the phase shifting means further comprise:

c. i. first bi-stable means, responsive to the input means and to the clock waveform, and having an output designated B and an output designated $\overline{B}$;

ii. second bi-stable means, responsive to the first bi-stable means and to the inverted clock waveform, having an output designated C and an output designated $\overline{C}$; and iii. a logic array, providing the logic output:

$$CLK \cdot C + \overline{CLK} \cdot \overline{B}.$$

12. The synchronizer of claim 11 wherein the combining means further comprise:

d. i. third bi-stable means, responsive to the output of the phase-shifting means, to provide a waveform that is ½ the frequency of the output waveform of the phase-shifting means; and ii. first logic means, having an input from the third bi-stable means and an input from the monitoring means, for providing an output waveform at the same frequency and in phase with the waveform output of the third bi-stable means in the absence of an indicator signal, and for providing an output waveform at the same frequency and phase-shifted one clock cycle in the other direction with respect to the waveform output of the third bi-stable means.

13. The synchronizer of claim 11 wherein the monitoring means further comprise:

f. i. fourth bi-stable means having an output connected to the combining means;

ii. Second logic means, having the indicator signal as an input and having an output from the fourth bi-stable means as an input, to condition the fourth bi-stable means to change from one bi-stable state to the other bi-stable state; and iii. third logic means having one input from the first bi-stable means and second input from the third bi-stable means, providing logic output:

$$B \cdot C + \overline{B} \cdot \overline{C},$$

operatively connected to cause the fourth bi-stable means to change from one bi-stable state to the other bi-stable state in the presence of the indicator signal.

14. The synchronizer of claim 12 wherein the monitoring means further comprise:

f. i. fourth bi-stable means having an output connected to the combining means;

ii. second logic means, having the indicator signal as an input and having an output from the fourth bi-stable means as an input, to condition the fourth bi-stable means to change from one bistable state to the other bi-stable state; and iii. third logic means having one input from the first bi-stable means and second input from the third bi-stable means, providing logic output:

$$B \cdot C + \overline{B} \cdot \overline{C}$$

operatively connected to cause the fourth bi-stable means to change from one bi-stable state to the other bi-stable state in the presence of the indicator signal.

15. The synchronizer of claim 14 wherein the output means are connected to the counter to monitor the state of the most significant bit of the counter.

16. An electronic synchronizer for synchronizing the pulse rate of the waveform of an internal clock of an electronic system with the pulse rate of an input pulse train representative of digital data, comprising:

a. input means for receiving the data pulses;

b. clock input means, for receiving the clock pulses;

c. phase-shifting means, electrically connected to the input means and the clock input means for reproducing the clock waveform, selectively phase-shifted ½ of 1 clock cycle in one direction;

d. combining means, electrically connected to the phase shifting means, for producing a reference pulse waveform at ½ the pulse rate of the clock waveform, selectively phase-shifted by ½ of 1 clock cycle in the one direction or in the other direction;

e. indicating means, for receiving the reference pulses from the combining means and for providing an indicator signal when a predetermined condition is reached;

f. monitoring means, for monitoring the indicating means and electrically connected to the combining means to selectively permit a phase-shift of one-half of 1 clock cycle in the one direction in the absence of an indicator signal and to permit a phase-shift of one-half of 1 clock cycle in the other direction in the presence of an indicator signal;

g. decoding means, operatively connected to the indicating means to provide an inhibit signal to the input means representative of a second predetermined condition of the indicating means;

h. inhibit means, operatively connected to the phase shifting means to prevent a phase shift in the presence of an inhibit signal and to permit a phase shift in the absence of an inhibit signal;

i. disabling means, operatively connected to disable the monitoring means in the presence of an inhibit signal; and j. output means, electrically connected to the indicating means, to provide a sampling signal to the electronic system when a predetermined condition is reached.

17. The synchronizer of claim 16 wherein the indicating means further comprise a counter, providing the indicator signal when a predetermined count is reached.

18. The synchronizer of claim 17 wherein the clock input means further comprise inverting means to receive the clock waveform, designated CLK, and to provide an inverted clock waveform designated $\overline{CLK}$.

19. The synchronizer of claim 18 wherein the phase-shifting means further comprise:

C. i. first bi-stable means, responsive to the input means and the clock waveform, and having an output designated B and an output designated $\overline{B}$;

ii. second bi-stable means, responsive to the first bi-stable means and to the inverted clock waveform, having an output designated C and an output designated $\overline{C}$; and iii. a logic array, providing the logic output:

$$CLK\cdot C + \overline{CLK}\cdot\overline{B}.$$

20. The synchronizer of claim 19 wherein the combining means further comprise:

d. i. third bi-stable means, responsive to the output of the phase-shifting means, to provide a waveform that is one half the frequency of the output waveform of the phase-shifting means; and ii. first logic means, having an input from the third bi-stable means and an input from the monitoring means, for providing an ouput waveform at the same frequency and in phase with the waveform output of the third bi-stable means in the absence of an indicator signal, and for providing an output waveform at the same frequency and phase-shifted one clock cycle in the other direction with respect to the waveform output of the third bi-stable means.

21. The synchronizer of claim 19 wherein the monitoring means further comprise:

f. i. fourth bi-stable means having an output connected to the combining means;

ii. second logic means, having the indicator signal as an input and having an output from the fourth bi-stable means as an input, to condition the fourth bi-stable means to change from one bi-stable state to the other bi-stable state; and iii. third logic means having one input from the first bi-stable means and second input from the third bi-stable means, providing logic output:

$$B\cdot C + \overline{B}\cdot\overline{C},$$

operatively connected to cause the fourth bi-stable means to change from one bi-stable state to the other bi-stable state in the presence of the indicator signal.

22. The synchronizer of claim 21 wherein the monitoring means further comprise:

f. i. fourth bi-stable means having an output connected to the combining means;

ii. second logic means, having the indicator signal as an input and having an output from the fourth bi-stable means as an input, to condition the fourth bi-stable means to change from one bi-stable state to the other bi-stable state; and iii. third logic means having one input from the first bi-stable means and second input from the third bi-stable means, providing logic output:

$$B\cdot C + \overline{B}\cdot\overline{C},$$

operatively connected to cause the fourth bi-stable means to change from one bi-stable state to the other bi-stable state in the presence of the indicator signal.

23. The synchronizer of claim 22 wherein the output means are connected to the counter to monitor the state of the most significant bit of the counter.

24. The synchronizer of claim 16 wherein the inhibit means further comprise a second logic array, having the inhibit signal as an input and having the data pulses as another input to provide a phase-shift signal to the phase-shifting means in the absence of an inhibit signal.

25. The synchronizer of claim 19 wherein the inhibit means further comprise a second logic array, having the inhibit signal as an input and having the data pulses as another input to provide a phase-shift signal to the phase-shifting means in the absence of an inhibit signal.

26. The synchronizer of claim 23 wherein the inhibit means further comprise a second logic array, having the inhibit signal as an input and having the data pulses as another input to provide a phase-shift signal to the phase-shifting means in the absence of an inhibit signal.

27. A method of phase-shifting a sampling pulse by one-half the clock cycle of a pulse-producing clock of an electronic system to synchronize the clock pulse frequency with that of an input electronic pulse train, comprising the steps of:

a. reproducing the clock pulse waveform, shifted in one direction by one-half of 1 clock cycle;

b. dividing the reproduced clock pulse waveform by 2 to form a reference pulse wavefrom;

c. counting the reference pulses and providing an indicator signal when a predetermined count is reached;

d. inverting the reference pulses in the presence of the indicator signal; and e. providing an output signal which occurs at a time determined by the counting of the reference pulses.

28. The method of claim 27 further comprising the steps of:

f. decoding the counting of the reference pulses to provide an inhibit signal when a predetermined count is reached; and g. inhibiting any phase shift of the clock pulses and any shift in the time of occurrence of the output sampling signal, in the presence of an inhibit signal.

29. The methof of claim 27 wherein the step of reproducing the clock pulse waveform further comprises:

a. i. forming a first single pulse, having a time period twice that of a single pulse of the input pulse train;

ii. forming a second single pulse identical to the first single pulse but phase shifted therefrom by one-half of 1 clock cycle in one direction; and iii. conditioning the clock pulses with the first and second single pulses to provide duplicated clock pulses phase shifted in the one direction by one-half of 1 clock cycle.

* * * * *